United States Patent [19]
Alcock et al.

[11] Patent Number: 5,315,612
[45] Date of Patent: May 24, 1994

[54] HIGH EFFICIENCY TRANSVERSELY PUMPED SOLID-STATE SLAB LASER

[75] Inventors: Alfred J. Alcock, Gloucester; John E. Bernard, Ottawa, both of Canada

[73] Assignee: National Research Council of Canada, Ottawa, Canada

[21] Appl. No.: 29,585

[22] Filed: Mar. 11, 1993

[51] Int. Cl.$^5$ ............................................. H01S 3/09
[52] U.S. Cl. ........................................ 372/69; 372/75; 372/93
[58] Field of Search .............................. 372/69–70, 372/75, 92, 93, 72, 83, 39

[56] References Cited

U.S. PATENT DOCUMENTS

| | | | |
|---|---|---|---|
| 4,785,459 | 11/1988 | Baer | 372/75 |
| 5,091,915 | 2/1992 | Tatsumi et al. | 372/75 |

FOREIGN PATENT DOCUMENTS

3297188  12/1991  Japan ............................ 372/75

*Primary Examiner*—Leon Scott, Jr.

[57] ABSTRACT

A novel diode bar, side-pumped laser cavity design having high optical to optical conversion efficiency and a high slope efficiency is provided. A slab geometry with a single, high angle of incidence internal reflection permits gain to be accessed near the pump face of a laser material which absorbs strongly at the pump wavelength.

13 Claims, 6 Drawing Sheets

HIGH EFFICIENCY TRANSVERSELY PUMPED SOLID-STATE SLAB LASER

FIELD OF THE INVENTION

The invention relates generally to optical resonator designs for solid-state lasers and more particularly to optical resonator designs for diode-pumped solid-state lasers.

BACKGROUND OF THE INVENTION

With the rapid development of diode-pumped solid-state lasers during the past few years, a number of approaches have been adopted with the aim of optimizing the overall efficiency of such devices. In small, diode-pumped systems, high optical to optical conversion is most easily achieved with longitudinal/end-pumping configurations, and the potential scalability of this technique has been demonstrated convincingly with the tightly folded resonator (TFR) design. This particular configuration, which uses a slab geometry, is disclosed in U.S. Pat. No. 4,894,839 issued Jan. 16, 1990 in the name of T. Baer. Baer discloses a pumping scheme with a plurality of spaced apart laser diode pumping sources positioned along a lateral side of a block of laser material. An optical resonator incorporating the block is configured in a tightly folded zig-zag configuration with the aim of optimizing the degree of spatial overlap between the pumped laser material and the optical resonator mode.

The alternative to end pumping is side-pumping, where the direction of pumping is transverse or orthogonal to the longitudinal axis of the laser cavity. Continuous wave (CW) or quasi-CW diode bars have been used in this configuration with relatively high power systems, however this approach tends to be much less efficient than end-pumping and considerable care must be taken to ensure that there is a high degree of overlap between the laser mode and the pumped volume. A major source of inefficiency in most side-pumping schemes is that the pump light is absorbed preferentially near the surface while the laser mode is located in the interior of the active medium. Partial solutions to this problem are: the use of a low absorption material with a large mode volume; partial focusing of the pump light in order to increase the pump intensity at the location of the mode; or, to use a slab geometry which makes direct use of the gain at the air/material interface. This last approach has the advantage that gain and refractive index non-uniformities are averaged-out by the mode as it interacts with the pumped region of the laser material. It is an object of this invention to provide a side-pumping configuration which is less complex but comparable in efficiency to the TFR scheme of Baer. Contrary to Baer's method this invention includes a laser cavity configured to have a reflection within the laser material at a high angle of incidence with respect to the normal rather than a tightly folded zig-zag configuration.

SUMMARY OF THE INVENTION

It is an object of the invention to provide a solid-state laser having a slab geometry and a high degree of spatial overlap between the region of highest gain and the laser mode.

In accordance with the invention, there is provided a method of generating an optical signal within a laser material having at least one flat pumping surface and having an absorption length at a pumping wavelength approximately equal to the radius of a laser mode of the optical signal, comprising the steps of: pumping the laser material with a light source directed towards the flat surface to produce gain within the laser material; and, forming a laser resonator by providing reflecting surfaces positioned so that a beam path of a resonant mode reflects from the flat pumping surface, the angle of reflection within the laser material being approximately 10 degrees or less with respect to the flat pumping surface.

In accordance with another aspect of the invention there is provided a method of amplifying an optical signal within an optically-pumped laser material having an absorption coefficient of at least 20 cm$^{-1}$ at the pump wavelength and having at least one flat pumping surface and end surfaces, comprising the steps of: pumping the laser material with a radiation source directed towards the flat surface to produce optical gain within the laser material; and directing the optical signal to reflect internally from the flat pumping surface at a grazing angle $\phi$ of approximately 10 degrees or less with respect to the flat surface.

In accordance with another aspect of the invention, there is provided an optically-pumped solid state amplification means comprising: a block of laser material having an absorption coefficient of at least 20 cm$^{-1}$ at the pump wavelength and having at least one flat pumping surface and end surfaces; pumping means positioned adjacent to at least one flat surface of the laser material for pumping the laser material to produce optical gain within the laser material with an optical signal directed towards the flat surface; and, laser cavity forming means in the form of reflecting surfaces positioned so that a beam path of a resonant mode reflects from the flat pumping surface, the grazing angle being the angle between the reflecting beam and flat pumping surface and being approximately 10 degrees or less with respect to the flat pumping surface, the fold angle being 160 degrees or more.

In accordance with another aspect of the invention, there is provided an optically-pumped solid state amplification means comprising: a block of laser material having an absorption coefficient of at least 20 cm$^{-1}$ at the pump wavelength and having at least one flat pumping surface and end surfaces; and, pumping means positioned adjacent to at least one flat surface of the laser material for pumping the laser material to produce optical gain within the laser material with an optical signal directed towards the flat surface so that the angle of reflection within the laser material is approximately 10 degrees or less with respect to the flat pumping surface.

The invention provides a cavity design which uses a single reflection at a high angle of incidence in an active material with a high absorption coefficient. This allows the beam to remain in the region of highest gain throughout its passage in the active material. Nd:YVO$_4$ was chosen as a preferred laser medium because of its very high absorption coefficient and stimulated emission cross section.

BRIEF DESCRIPTION OF THE DRAWINGS

Exemplary embodiments will be described in conjunction with the drawings in which.

DETAILED DESCRIPTION

Figure 1:
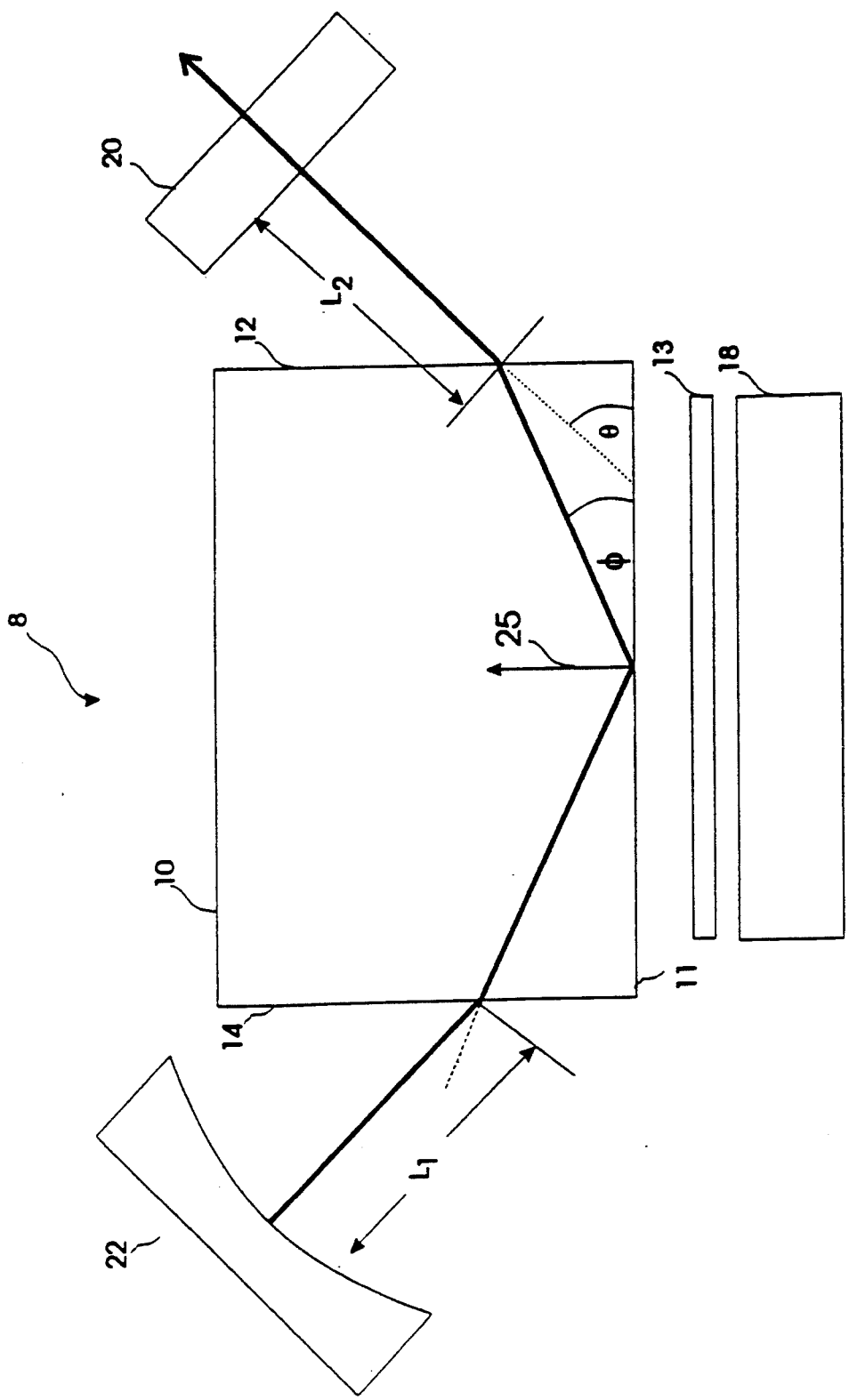
FIG. 1 is a top view of a high efficiency diode pumped slab laser in accordance with the invention.

Referring to FIG. 1 a solid-state laser 8 is formed of a block 10 of Nd:YVO$_4$ or other solid-state laser material. By way of example, the block 10 is a 3% doped Nd:YVO$_4$ parallelepiped bar having dimensions of 10.1 mm by 2.5 mm by 3.0 mm. Both a-cut polished flat ends 12 and 14 are parallel to each other and are anti-reflection coated for a wavelength of 1.06 $\mu$m. An uncoated polished flat face 11 of the block 10 is positioned to receive light from a pumping source in the form of a laser diode bar 18 proximate to the block 10. Alternatively, other pumping means pumping light at wavelengths ranging from 200 to 2000 nanometers may be used. Emission from the laser diode 18 is matched to the mode volume of the laser by means of a fiber lens collimator 13.

In some cases the collimator may be unnecessary; the laser diode 18 could be butted against the block 10. Laser cavity forming means in the form of a partially transmissive output coupler mirror 20 and a highly reflective mirror 22, are shown adjacent to ends 12 and 14 of the block respectively. The mirrors 20 and 22 are positioned at angles to allow a resonant mode having a beam to be reflected from the flat pumping surface at a high angle of incidence with respect to the normal (shown as 25) or grazing angle $\phi$ of approximately 10 degrees or less with respect to the flat face 11. Of course, due to the difference in the refractive index of the block 10 and the air interface surrounding the block, the external angle $\theta$ shown in FIG. 1 may be greater than 10 degrees. Although accurate positioning of the mirrors 20 and 22 is critical in obtaining the beam to be reflected from the flat pumping surface at a small grazing angle $\phi$ of about 10 degrees or less, other embodiments may be envisaged to achieve that end; for example the mirrors may be integral with the block 10 and the ends of the block cut so that they are slanted with respect to the flat face 11 and coated with suitable reflective coatings to form a laser cavity.

Figure 3:
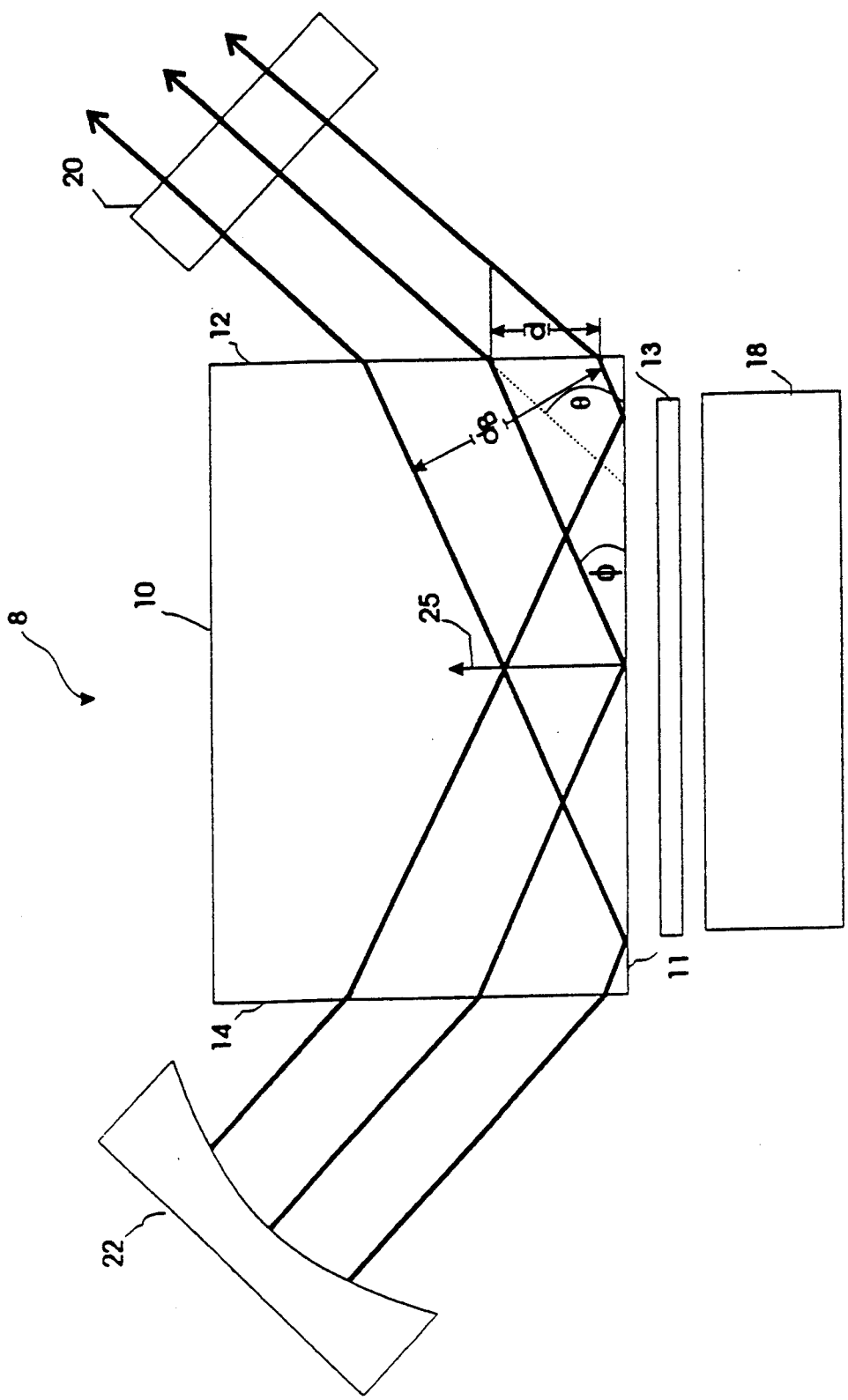
FIG. 3 is a top view of the high efficiency slab laser shown in FIG. 1 with a beam diameter of $d_B$.

Referring to FIG. 3 a laser mode having a diameter $d_B$ is shown; the radius of the mode is $r_B$ and the reflection angle is $\phi$. $d_B$ is of the order of 1/10th of the length of the pumped region. the highest gain is at the pump face of the slab or block 10 and the gain decreases exponentially away from the pump face in the direction of the arrow 25. In order to extract as much energy from the pumped material (block 10) as possible, the laser mode radius $r_B$ should be comparable to the absorption depth $1/\alpha$, where $\alpha$ is the absorption coefficient of the laser material at the pump wavelength, and the beam reflection angle $\phi$ should be kept as small as possible so that the beam travels through the region of highest gain as it travels through the laser material.

Figure 4:
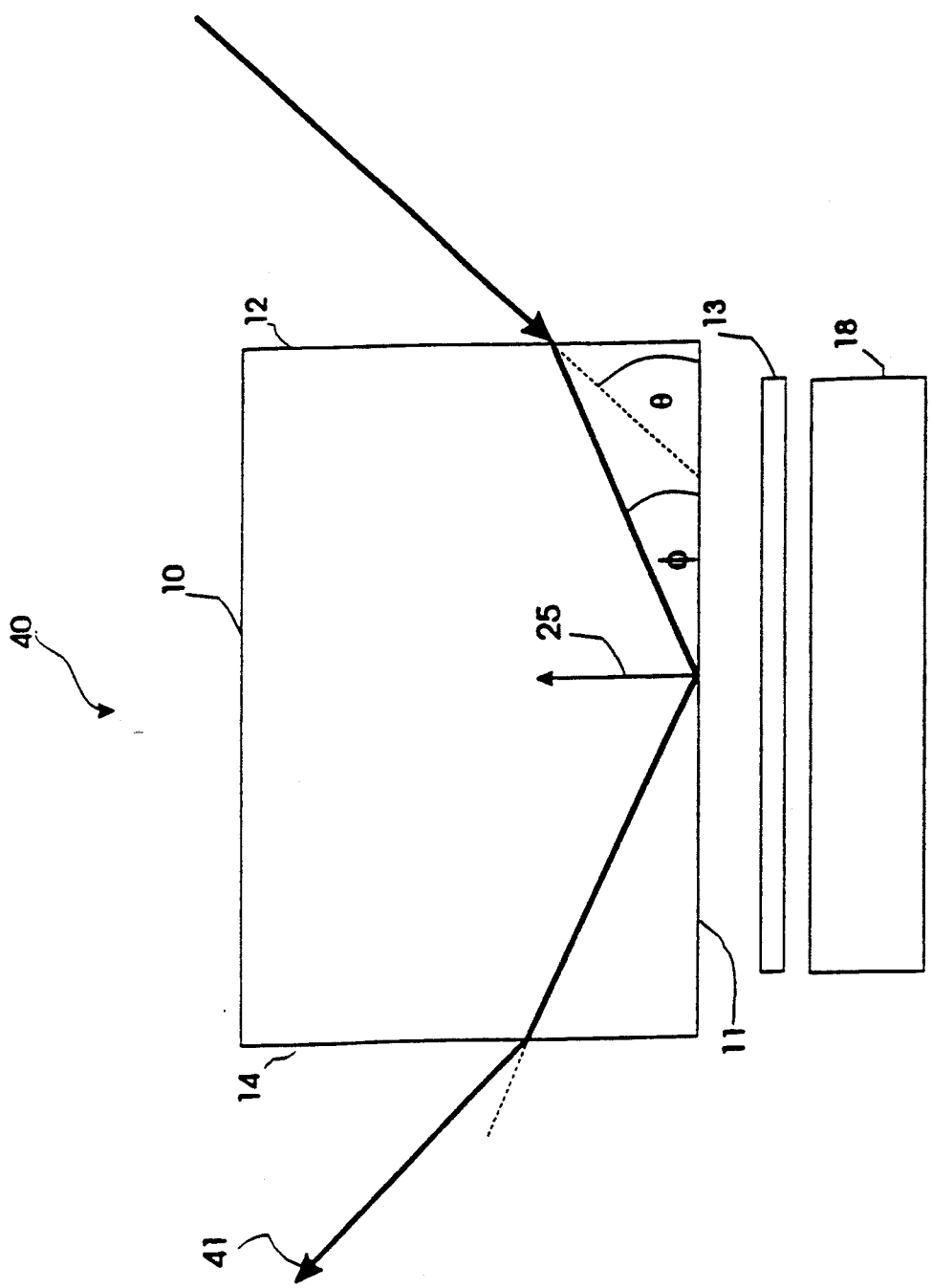
FIG. 4 is a top view of a high efficiency amplifier in accordance with the invention.

In FIG. 4 an amplifying means 40 is shown. The arrangement is similar to that shown in FIG. 3, however no mirrors are required. A laser beam 41 enters the block 10 at an angle $\theta$ with respect to the flat pump face and reflects off the face of the block at an angle $\theta$. The beam 41 is amplified as pump radiation is directed towards the face 11 and into the block 10. As described above, to achieve high gain, preferably the angle $\phi$ should be kept as small as possible.

Figure 5:
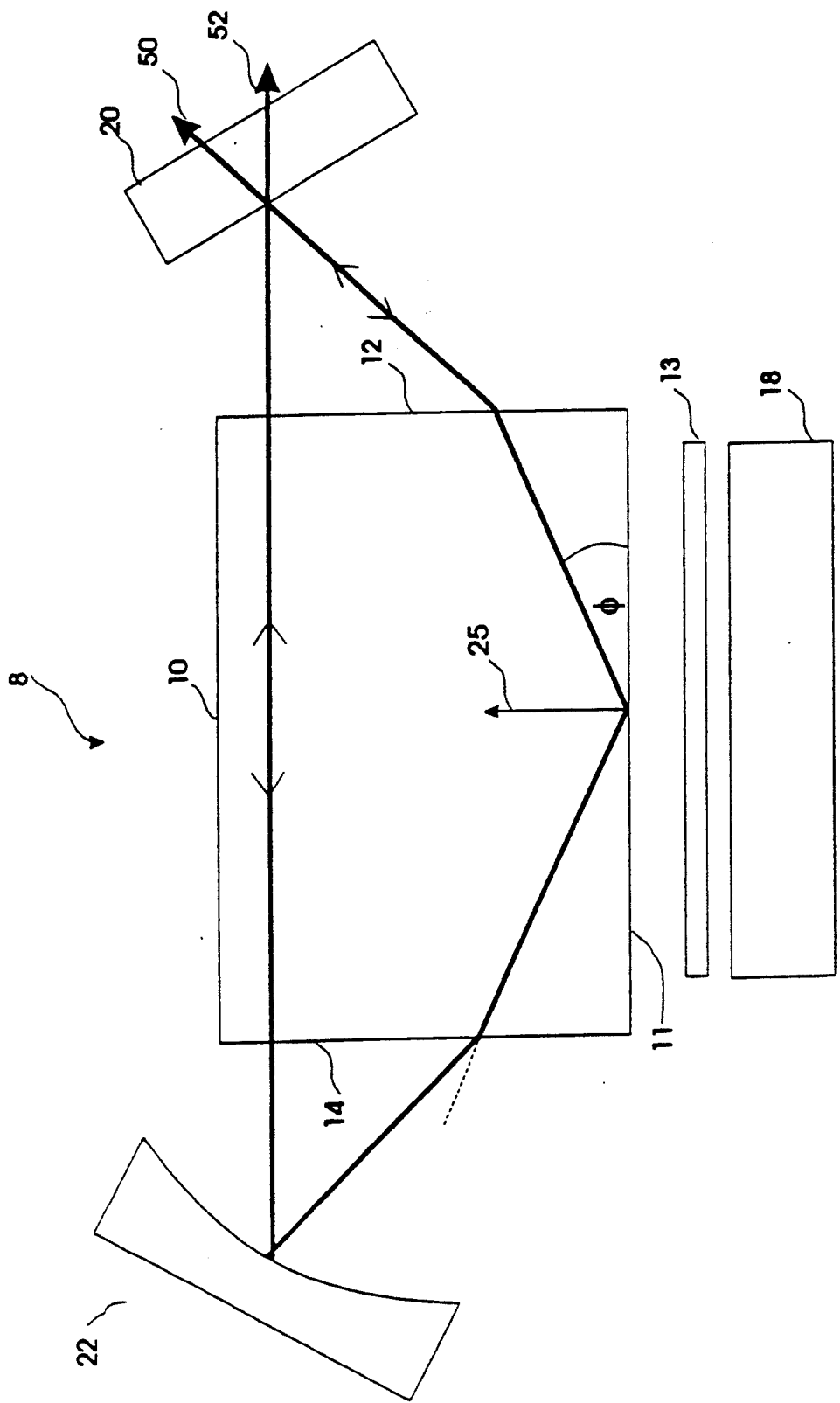
FIG. 5 is a top view of the high efficiency slab laser shown in FIG. 1 with mirrors tilted to form a ring configuration; and, FIG. 6 is a top view of another ring configuration of a high efficiency slab laser having two diode pumps at opposing sides of a slab.

Referring to FIG. 5, mirrors 20 and 22 are tilted at different angles to those of FIG. 1; the resulting cavity formed by the mirrors is a ring cavity. This arrangement generates two output beams 50 and 52; however, the same configuration may be used in conjunction with a Faraday isolator to ensure unidirectional operation and thus provide a single output beam.

Figure 6:
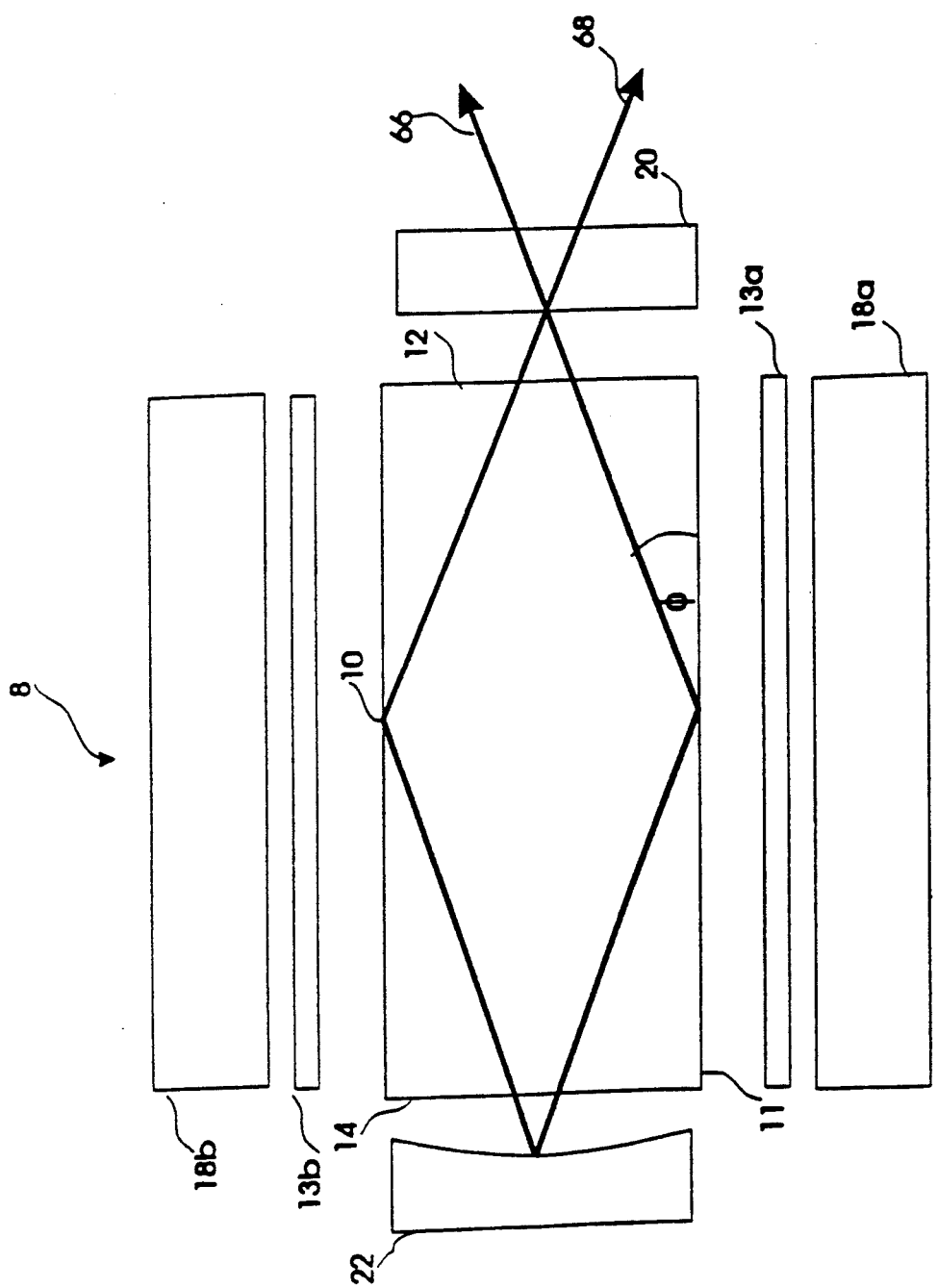

FIG. 6 shows another embodiment of the ring cavity. Two diode pumping sources 18$a$ and 18$b$ pump opposing faces of the block 10 to generate two laser beams 66 and 68. Of course, in both the embodiments of FIGS. 5 and 6 the angle $\phi$ should be kept as small as possible.

TEST RESULTS

The performance was demonstrated with a bar of Nd:YVO$_4$ doped with 3% Nd. The pump source was a 1 cm long quasi-CW diode laser bar (SDL model 3230-TZ) which produced 200 $\mu$s square pump pulses with energies of up to 12 mJ at a repetition rate of 16 Hz. A 0.25 mm diameter fiber lens was used to partially collimate the diode laser output so as to control the spatial extent of the pumping. The laser cavity was formed between a concave high reflector (reflectivity $R_1 \approx 1$) and a plane output coupler ($R_2$ 0.475–0.985) with a single bend due to total internal reflection located at the centre of the pump face. External angles, $\phi$ ranged from 0 to 10 degress. In order to assure that the curvature of the mode within the rod was small, the laser rod was located close to the flat output coupler. The radius of curvature of the high reflector and the total cavity length were chosen to produce the maximum output energy and best quality laser mode.

For cavity parameters which gave a moderately small mode radius of 130 $\mu$m ($L_1$=23 mm, radius $r_1$=100 mm, $L_2$=9 mm) the best beam quality was obtained at an angle of $\theta$=4 degrees. At smaller angles the output pulse energy was higher but the beam showed a multimode structure caused by diffraction at the rod ends and the steep gradient in the gain across the beam cross section. At angles greater than 6 degrees the output energy was even larger but the beam was stretched horizontally to a diameter at least twice that in the vertical direction. Some structure in the horizontal direction was also present. At an external angle of 4 degrees the output beam appeared to be TEM$_{oo}$ and was not sensitive to a small misalignment of the cavity mirrors or the focusing of the pump light. Careful measurement of the beam waist at the focus of a diffraction limited lens and the subsequent divergence gave values of $M^2$ of approximately 1.3 and 3.9 in the horizontal and vertical directions respectively. The apparently poor beam quality in the vertical direction was unexpected from the measured far-field beam profile. Strong gain variations in the vertical direction due to non-uniform pumping in that direction are a likely source of this large divergence.

Figure 2:
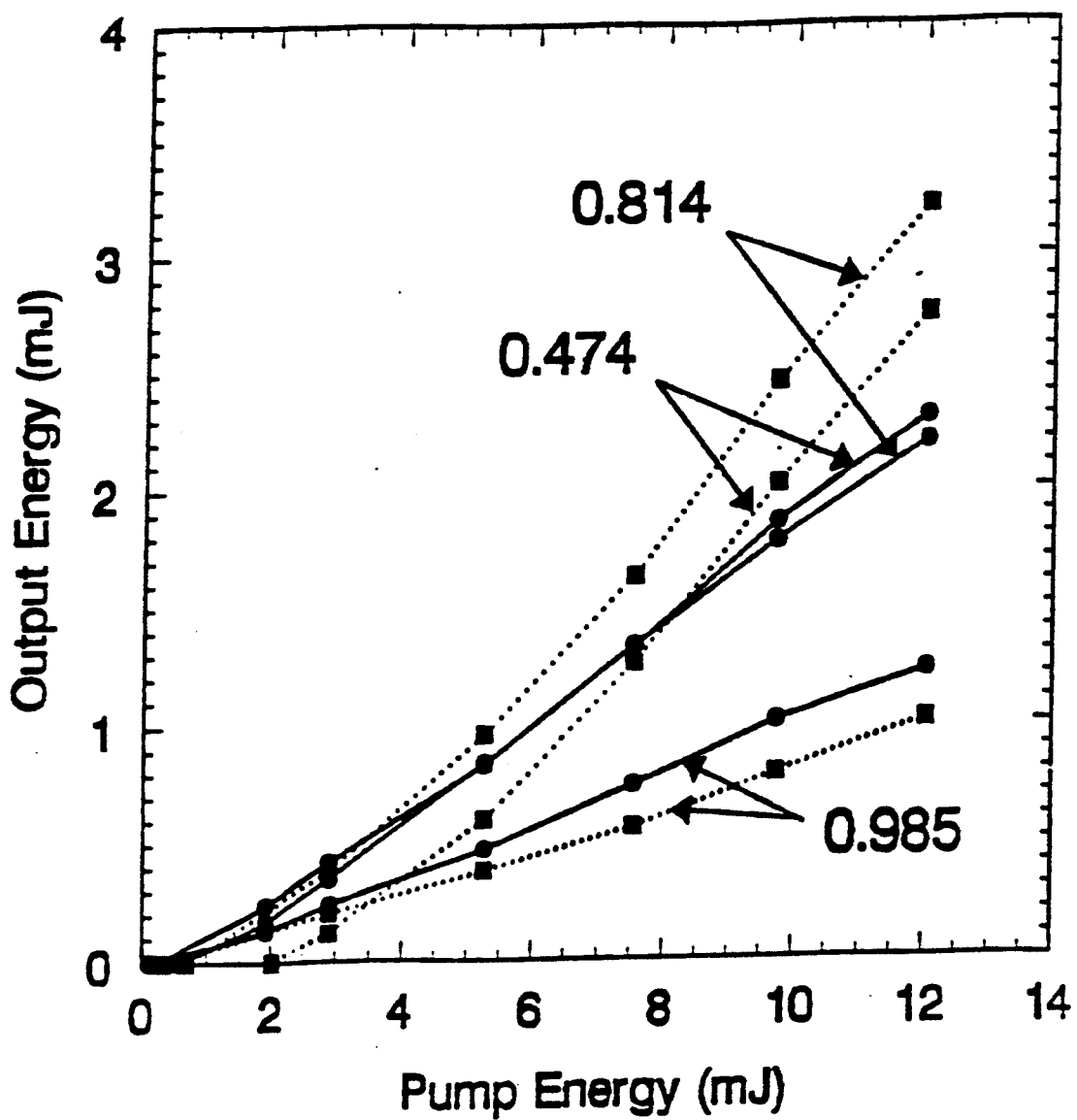
FIG. 2 is a graph of output pulse energy as a function of the pump energy.

The output pulse energy vs. the total uncorrected pump energy from the diode bar is shown in FIG. 2 (solid curves) for output mirror reflectivities, $R_2$ of 0.475, 0.815, and 0.985. The highest output was obtained with $R_2$=0.475 which indicates that the gain was high. Up to 2.3 mJ was obtained for a pump energy of 12 mJ. The output pulses were polarized parallel to the crystal c-axis and were approximately 200 μs long with no observable oscillations. A maximum optical slope efficiency of 22% and an optical to optical conversion efficiency of 19% were obtained. If reflection losses at the uncoated fiber lens (n≈1.5) and the pump face (n≈1.96 for pump light polarized perpendicular to the c-axis) are included, these values increase to 27% and 23%, respectively.

The output energy from the laser varied with the temperature of the diode pump. Measurements of the absorption of the pump light as a function of the temperature of the diode bar heat sink showed that the maximum output energy occurred at the same temperature as the maximum absorption. A peak absorption coefficient of approximately 75 cm$^{-1}$ was measured for light polarized parallel to the crystal c-axis—more than twice the value of 30 cm$^{-1}$ measured for the perpendicular polarization which was used in the present experiment. Since the output energy increased with absorption, improved efficiency may be achieved by rotating the pump polarization. However, the required additional optical elements complicate the present simple pumping arrangement.

The cavity losses can be estimated from the measured threshold pump energy for a range of output coupler reflectivities. A loss per pass of 8% was found using a modified Findlay-Clay analysis of Tucker et al. as described in J. App. Phy. Vol. 48 pp. 4907, 1977. Some of this loss is expected to be due to material absorption, scattering, and reflection losses at the total internal reflection surface. However, a calculation of the laser mode size inside the rod reveals that diffraction losses for our geometry were probably significant. The calculated mode radius for the cold cavity is approximately 130 μm. For an external angle of $\theta = 4°$, the distance between the centre of the mode and the pump face at the end of the rod is only 160 μm, and therefore one can expect diffraction losses at the ends of the rod to play an important role.

Diffraction losses explain why the laser mode was round for $\theta = 4°$. At angles, $\theta > 4°$ the losses were less severe and the high gain along the pump face caused the mode to stretch out horizontally. Only at 4° did the diffraction losses balance the tendency of the gain to stretch the mode. To test this model, $\theta$ was increased to 10° and cavity parameters were chosen to give a larger mode which would experience higher diffraction losses. Since a larger mode should also sample more of the pumped laser material, the output energy can be expected to increase.

These predictions were confirmed. Cavity parameters of $r_1 = 1$ m, $L_1 = 102$ mm, and $L_2 = 9$ mm with $\theta = 10°$ resulted in a good TEM$_{oo}$ mode with measured M$^2$ values of 1.5 and 1.6 in the horizontal and vertical directions, respectively. The output pulse energy as a function of the pump energy is shown in FIG. 2 (dotted curves) from which a loss per pass of approximately 6% is obtained. An output of 3.2 mJ for a 12 mJ pump pulse was obtained for an output coupler reflectivity of 0.815. The maximum optical to optical conversion efficiency corrected for reflection losses was 32% with a slope efficiency of 44%.

It is interesting to compare the suspected diffraction losses for the cavity parameters which resulted in the best mode profile at 4° and 10°. The mode radius calculated for the cold cavity at $\theta = 10°$ is 330 μm. The ratio between this value and the distance between the pump face and the beam centre at the end of the rod is 330/400 = 0.83 compared to a ratio of 130/160 = 0.81 obtained for $\theta = 4°$. Therefore the diffraction losses were roughly equal at the two angles.

The observation of lasing at moderate pump energies and with output coupling of greater than 50% indicates that the gain within the laser material was high. We can use a simple model to calculate the average small signal gain experienced by the laser mode at threshold and then estimate the gain at higher pump energies.

For a pump pulse with a duration comparable to the fluorescence lifetime of the upper laser level, the maximum gain is given by, $$g(T_p) = \sigma N_u(T_p) = (\sigma \lambda_p (QE) f_B \tau_u P_p)/(hc)[1 - exp(-T_p/\tau_u)] \quad (1)$$

where $T_p$ is the period of the pump pulse, $\sigma$ is the stimulated emission cross section, $N_u(t)$ is the density of atoms in the upper laser level at time t, $\lambda_p$ is the pump wavelength, (QE) is the quantum efficiency of pumping to the upper laser level, $f_B$ is the fraction of the excited atoms which are in the appropriate sublevel of the upper laser level, $\tau_u$ is the fluorescence lifetime, and $P_p$ is the pump power absorbed per unit volume. For pumping at $\lambda_p = 809$ nm, QE ~ 1 and $f_B \approx 0.52$ for Nd:YVO$_4$ reported by Tucker et al. The stimulated emission cross section for Nd:YVO$_4$ is a factor of 2.7 larger than that for Nd:YAG ($\sigma_{yag} = 6.5 \times 10^{-19}$ cm$^2$) or $\sigma_{YVO_4} = 1.8 \times 10^{-18}$ cm$^2$. A value of $\tau_u = 50$ μs was calculated from the measured decay of the fluorescence. This value is approximately half the fluorescence lifetime of 98 μs measured for 1% Nd:YVO$_4$ and indicates that there was significant concentration quenching at the high doping level used. Both the value of the stimulated emission cross section and the previously measured lifetime were measured by Tucker et al.

If wer assume that the pump beam has a Gaussian profile with a 1/e$^2$ half-width of $y_o$ and is uniform along its length $L_p$, then the power absorbed per unit volume in the laser medium, averaged across the mode diameter in the direction parallel to the pump face and at the average distance, $d_{av}$, of the laser mode axis from the pump face, is given by $$P_p = (P_o \alpha_p / 2L_p \omega) exp(-\alpha_p d_{av}) erf[(\sqrt{2})\omega/y_o] \quad (2)$$

Here, $\omega$ is the mode's 1/e$^2$ radius, $\alpha_p$ is the absorption coefficient for the pump radiation, and $P_o$ is the total pump power ($P_o = E_o/T_p$) where $E_o$ is the total pump energy. The error function in Eq. 2 was approximately equal to 1 in all cases since $y_o$ was measured to be less than 100 μm. By substituting the appropriate values for $d_{av}$ and $\theta = 4°$ and 10° into Eqs. 1 and 2, the small signal gain can be calculated. The results, calculated at the measured threshold pump energies (corrected for reflection losses), are listed in Table 1 along with the threshold gain calculated from the mirror reflectivities and the measured distributed losses. The agreement between the two values is quite good.

Eqs. 1 and 2 can be used to estimate the small signal gain at higher pump energies. A gain coefficient of 8.4 cm$^{-1}$ in the Nd:YVO$_4$ at $\theta = 4°$ is predicted for a pump energy of only 12 mJ. Such a high gain requires special precautions if it is to be used in an amplifier. For example, reflections off the antireflection coatings can be sufficient to produce lasing. Indeed, in our experiment we observed self-lasing at pump energies greater than 6 mJ, where the predicted small signal gain at the pump surface was 5.4 cm$^{-1}$. This is in reasonable agreement with a predicted threshold gain of 6.5 cm$^{-1}$ expected for our 0.15% reflective AR coatings.

In conclusion, the use of a high absorption laser material in a slab geometry with a total internal reflection at a high angle of incidence has resulted in a laser system with an efficiency and gain comparable to that obtained with the tightly folded resonator configuration. Aperturing by the laser rod itself has been found to be critical in limiting the effects of the high, non uniform gain on the quality of the laser mode. The simplicity of the cavity design and the high optical to optical conversion efficiency obtained for an external angle of $\theta=10°$ or an internal angle of approximately or less than $\theta=5°$ make this laser attractive for low power applications. It is especially suited to long pulse applications or high repetition rate q-switching using a CW pump. It should also be noted that the projection of the beam diameter along the length of the pumping surface is approximately equal to or less than the length of the pumped region.

Of course, numerous other embodiments may be envisaged without departing from the spirit and scope of the invention.

TABLE 1

| Mirror Reflectivity | Threshold energy (mJ) | Threshold gain (cm$^{-1}$) | Calculated gain (cm$^{-1}$) |
| --- | --- | --- | --- |
| Nd:YVO$_4$ 4° | | | |
| 0.475 | 0.45 | 0.45 | 0.38 |
| 0.815 | 0.17 | 0.19 | 0.14 |
| 0.985 | 0.091 | 0.090 | 0.077 |
| Nd:YVO$_4$ 10° | | | |
| 0.475 | 1.66 | 0.43 | 0.39 |
| 0.815 | 0.57 | 0.16 | 0.13 |
| 0.985 | 0.27 | 0.069 | 0.063 |

What we claim is:

1. A method of generating an optical signal within a laser material having at least one flat pumping surface and having an absorption length at a pumping wavelength approximately equal to the radius of a laser mode of the optical signal comprising the steps of;
    pumping the laser material with a light source directed towards the flat surface to produce gain within the laser material; and,
    forming a laser resonator by providing reflecting surfaces positioned so that a beam path of a resonant mode reflects at a grazing angle from the flat pumping surface, the grazing angle being the angle between the reflecting beam and flat pumping surface and being approximately 10 degrees or less with respect to the flat pumping surface so that the beam travels through the region of highest gain as it travels through the laser material, the fold angle being 160 degrees or more.

2. The method as defined in claim 1 wherein a central axis of the resonant mode reflects at the flat pumping surface at a point equal to or near the midpoint of the flat pumping surface.

3. The method as defined in claim 2 wherein a projection of the laser mode diameter along the length of the pumping surface is approximately equal to or less than the region pumped by the pump laser and lies within the pumped region.

4. The method as defined in claim 3 wherein the pumping source is a semiconductor diode laser array or bar.

5. The method as defined in claim 4 wherein the beam diameter is less than or approximately equal to 1 millimeter.

6. The method as defined in claim 5 wherein the laser material has an absorption coefficient of at least 20 cm$^{-1}$ at the pump wavelength and wherein the angle of reflection within the pumping material at the pumping surface is approximately equal to or less than 5 degrees.

7. A method of amplifying an optical signal within an optically-pumped laser material having an absorption coefficient of at least 20 cm$^{-1}$ at the pump wavelength and having at least one flat pumping surface and end surfaces, comprising the steps of:
    a) pumping the flat surface with a light source directed towards the flat surface to produce optical gain within the laser material; and,
    b) directing the optical signal to reflect internally from the flat pumping surface at a grazing angle $\phi$ of approximately 10 degrees or less with respect to the flat surface so that the beam travels through the region of highest gain as it travels through the laser material.

8. A method of amplifying an optical signal within an optically-pumped laser material having an absorption coefficient of at least 20 cm$^{-1}$ at the pump wavelength and having at least one flat pumping surface and end surfaces, comprising the steps of:
    a) pumping the flat surface with a light source directed towards the flat surface to produce optical gain within the laser material; and,
    b) directing the optical signal to reflect internally from the flat pumping surface at a grazing angle $\phi$ of approximately 10 degrees or less with respect to the flat surface.

9. A method as defined in claim 8 wherein the laser material is a Neodymium doped laser material.

10. A diode pumped solid state amplification means comprising:
    a block of laser material having an absorption coefficient of at least 20 cm$^{-1}$ at the pump wavelength and having at least one flat pumping surface and end surfaces;
    pumping means positioned adjacent to at least one flat surface of the laser material for pumping the laser material with an optical signal directed towards the flat surface to produce optical gain within the laser material; and
    laser cavity forming means in the form of reflecting surfaces positioned so that a beam path of a resonant mode reflects at a grazing angle from the flat pumping surface, the grazing angle being the angle between the reflecting beam and flat pumping surface and being approximately 10 degrees or less with respect to the flat pumping surface so that the beam travels through the region of highest gain as it travels through the laser material, the fold angle being 160 degrees or more.

11. A diode pumped solid state amplification means comprising:
    a block of laser material having an absorption coefficient of at least 20 cm$^{-1}$ at the pump wavelength and having at least one flat pumping surface and end surfaces;
    pumping means positioned adjacent to at least one flat surface of the laser material for pumping the laser material with an optical signal directed towards the flat surface to produce optical gain within the laser material; and laser cavity forming means in the form of reflecting surfaces positioned so that a beam path of a resonant mode reflects at a grazing angle from the flat pumping surface, the grazing angle being the angle between the reflecting beam and flat pumping surface and being approximately 10 degrees or less with respect to the flat pumping surface, the fold angle being 160 degrees or more.

12. An optically-pumped solid-state light amplification means as defined in claim 10 wherein the laser cavity forming means are formed by providing a reflective coating on the ends of the block of laser material.

13. An optically-pumped solid state amplification means comprising:

a block of laser material having an absorption coefficient of at least 20 $cm^{-1}$ at the pump wavelength and having at least one flat pumping surface and end surfaces; and, pumping means positioned adjacent to at least one flat surface of the laser material for pumping the laser material to produce optical gain within the laser material with an optical signal directed towards the flat surface, so that the angle of reflection within the laser material is approximately 10 degrees or less with respect to the flat pumping surface, so that the beam travels through the region of highest gain as it travels through the laser material, the fold angle being 160 degrees or more.

* * * * *